United States Patent
Wulf

(10) Patent No.: US 6,717,615 B1
(45) Date of Patent: Apr. 6, 2004

(54) DEVICE FOR ADJUSTMENT OF A LINE SENSOR IN A FILM SCANNER

(75) Inventor: Rudolf Wulf, Riedstadt (DE)

(73) Assignee: Thomson Licensing S.A., Boulogne (FR)

( * ) Notice: Subject to any disclaimer, the term of this patent is extended or adjusted under 35 U.S.C. 154(b) by 0 days.

(21) Appl. No.: 10/333,557

(22) PCT Filed: Jul. 12, 2001

(86) PCT No.: PCT/EP01/08033

§ 371 (c)(1),
(2), (4) Date: Jan. 22, 2003

(87) PCT Pub. No.: WO02/09441

PCT Pub. Date: Jan. 31, 2002

(30) Foreign Application Priority Data

Jul. 22, 2000 (DE) .................................... 200 12 733 U

(51) Int. Cl.[7] ............................ G02B 27/10; H04N 9/09
(52) U.S. Cl. .......................... 348/265; 348/97; 348/262; 353/23; 352/229
(58) Field of Search .............................. 353/22, 23, 95, 353/122; 348/96–98, 262, 265, 276, 374; 352/119–120, 242–243, 229

(56) References Cited

U.S. PATENT DOCUMENTS

| 5,828,409 A | 10/1998 | North et al. ................. 348/374 |
| 5,886,772 A | 3/1999 | Inatome et al. ............. 352/225 |

FOREIGN PATENT DOCUMENTS

| EP | 889 644 | 1/1999 | .......... H04N/5/335 |
| JP | 184387 | 6/2000 | ............ H04N/9/09 |
| JP | 184388 | 6/2000 | ............ H04N/9/09 |

*Primary Examiner*—Russell Adams
*Assistant Examiner*—Michael Dalakis
(74) *Attorney, Agent, or Firm*—Joseph S. Tripoli; Harvey D. Fried; Francis A. Davenport

(57) ABSTRACT

The invention relates to a device for adjustment of a line sensor in a film scanner. A glass disk is arranged between each emitting surface of a color separator and the respective line sensor. Said disk may be rotated in two directions, out of a plane lying perpendicular to the beam direction, such that the light emitted from the glass disc is displaced, depending on the angle of the rotation.

8 Claims, 2 Drawing Sheets

DEVICE FOR ADJUSTMENT OF A LINE SENSOR IN A FILM SCANNER

This application claims the benefit under 35 U.S.C. § 365 of International Application PCT/EP01/08033 filed Jul. 12, 2001, which claims the benefit of German Application No. 200 12 733.0, filed Jul. 22, 2000.

The invention relates to an apparatus for adjusting a line sensor in a film scanner.

BACKGROUND OF THE INVENTION

Film scanners are appliances in which the film is scanned optically in order to obtain video signals which can be processed, transmitted or stored once again. Various physical forms have become known for this purpose. In one of these physical forms, the film is imaged for colour scanning by means of a suitable objective and a colour splitter onto three line sensors—also referred to as CCD sensors. The images are then scanned line-by-line by moving the film, with the scanning in the line direction being carried out by clocked reading in the individual elements of the line sensor.

Convergence errors, which are also referred to as registration errors and which can be seen in the form of coloured edges when the video signals are reproduced, can occur between the three primary colours red, green and blue as a result of tolerances of the optical elements and inaccuracies in the mounting of the line sensor on a holder.

SUMMARY OF THE INVENTION

The object of the present invention is to provide an apparatus which allows very accurate fine adjustment of the position of the images on the line sensors.

This object is achieved according to the invention in that a glass pane is arranged between in each case one outlet surface of a colour splitter and the respective line sensor and can be pivoted in two directions out of a plane lying at right angles to the beam direction, so that the light emerges offset from the glass pane as a function of the pivoting angle.

The invention has the advantage that the three primary colours of a film image are set in position with pinpoint accuracy, and can thus be made to coincide. A further advantage is that the apparatus according to the invention can not only be produced at low cost, but is also temperature-stable.

One advantageous refinement of the invention consists in that depending on the pivoting direction, the glass pane is mounted on two contact points in a housing, and the pivoting directions are essentially at right angles to one another, with one contact point being provided jointly for both pivoting directions. The position of the three primary colours can thus be adjusted independently of one another in the horizontal and vertical directions.

One advantageous embodiment of the invention consists in that the glass pane is held firmly in a metal plate which can pivot and has an incline for each pivoting direction, on which incline an adjusting screw, which is arranged in a housing, acts against the force of a spring force which acts between the metal plate and the housing. In addition to the already mentioned advantages, this embodiment is distinguished by the fact that the adjusting screws are easily accessible and can be operated from a direction at right angles to the respective optical axis.

A further advantageous refinement of the apparatus according to the invention not only allows the positions of the images to be adjusted, but also allows adjustment of the focusing for each individual line sensor, in that the line sensor is arranged on a mount which can pivot about an axis parallel to the lines. In this refinement as well, easy accessibility to the adjusting screws can be achieved in that the mount is provided with an incline on the side of the line sensor opposite the pivoting axis, on which incline an adjusting screw acts against a spring force.

A further requirement for correct scanning of the film images is that all the line sensors are at the same angle, which means that the respectively scanned lines are parallel to the frame line. In order to correct any errors relating to this, one development of the invention provides that the line sensor is arranged on the mount by means of a sensor holder, in that the sensor holder has two pins in an extension of the longitudinal axis (line direction) of the line sensor, which pins project into holes in the mount and have play at right angles to the line direction, and in that an adjusting screw projects from each of the two sides into the hole.

One of the pins is defined as a reference point with respect to the line. In order that this pin is located in the correct position in the line direction when it is inserted into the mount, the development can be triggered such that the pins are flattened on one side.

BRIEF DESCRIPTION OF THE DRAWINGS

One exemplary embodiment of the invention will be explained in more detail in the following description and is illustrated in a number of figures in the drawing, in which.

Identical parts are provided with the same reference symbols in the figures.

DETAILED DESCRIPTION

Figure 1:
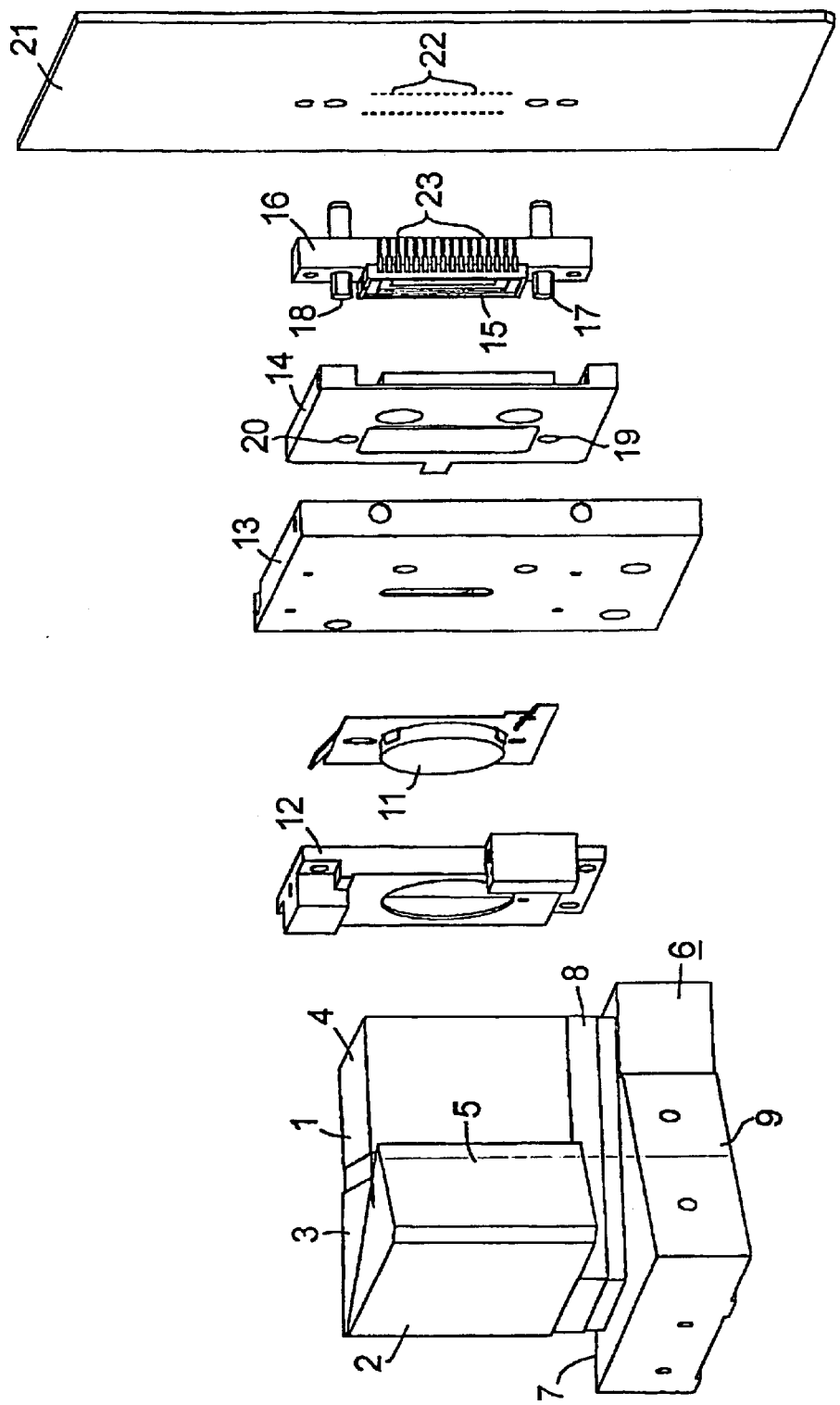
FIG. 1 shows the parts of a film scanner which are necessary to explain the invention.

A colour splitter 1, which is formed from prisms, splits the coloured image supplied to the inlet surface 2 from a respective film, which is not shown, into the three primary colours, red, green and blue, which emerge at outlet surfaces 3, 4, 5 from the colour splitter. Each of these colour outlet openings is associated with a line sensor and associated adjusting and mounting elements. For the sake of clarity, these elements and the line sensor are shown for only one of the outlet surfaces. The colour splitter 1 is located on a mounting block 6, which has a mounting surface 7, 8, 9 for in each case one of the outlet surfaces 3, 4, 5.

To allow the items to be identified better, the other elements illustrated in FIG. 1 are shown in the form of an exploded illustration. The light which emerges from the outlet surface 4 of the colour splitter 1 first of all passes through a glass pane 11, which is used for position correction and is mounted in a housing 12 such that it can be pivoted in two directions. In the assembled state, the housing 12 is screwed to a mounting plate 13, which is in turn screwed to the mounting surface 8 of the mounting block 6.

The mounting plate contains a mount 14 for the line sensor 15, which is connected to the mount 14 via a sensor holder 16 such that pins 17, 18 enter corresponding holes 19, 20 in the mount 14. Pins are likewise located on the rear face of the sensor holder 16, and are used for the mounting of a printed circuit board 21. The printed circuit board 21 furthermore has holes 22 for the connecting pins 23 of the line sensor 15, and a range of circuits, which are not illustrated, for operation of the line sensor.

Figure 2:
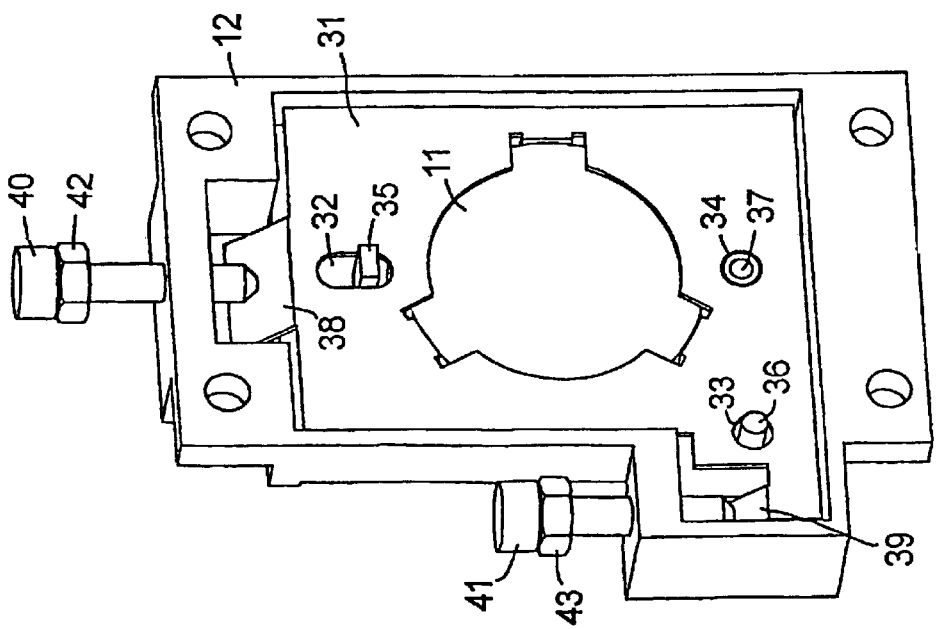
FIG. 2 shows a glass pane which can be pivoted in order to adjust the horizontal and vertical position of the film line which is imaged on the line sensor.

FIG. 2 shows details of the position adjusting device with the glass pane 11 and the housing 12. The glass pane 11 is firmly connected to a metal plate 31 which has three cutouts 32, 33, 34 for pins 35, 36, 37 which project into the cutouts, fixed to the housing. The pin 37 is provided with a head which projects beyond the opening 34, although this is not illustrated in FIG. 2, for the sake of clarity. Springs, which are likewise not illustrated, exert a force on the metal plate 31.

The metal plate 31 is prevented from falling out firstly by the head (which is not illustrated) of the pin 37 and secondly by two integrally formed inclines 38, 39, which interact with adjusting screws 40, 41. Lock nuts 42, 43 are used for fixing the screws once the adjustment process has been completed. For vertical adjustment, that is to say at right angles to the line direction, the screw 41 is rotated, with the metal plate 31 and hence the glass pane 11 being pivoted about the point at 37 and the contact point of the screw 40 with the incline 38.

Once the vertical position has been set, the horizontal position can be adjusted by means of the screw 40, with the pivoting axis then being formed by the point 37 and the contact point of the screw 41 with the incline 39. Since the pivoting axes are virtually parallel to one another, the adjustment processes can be carried out independently of one another.

Figure 3:
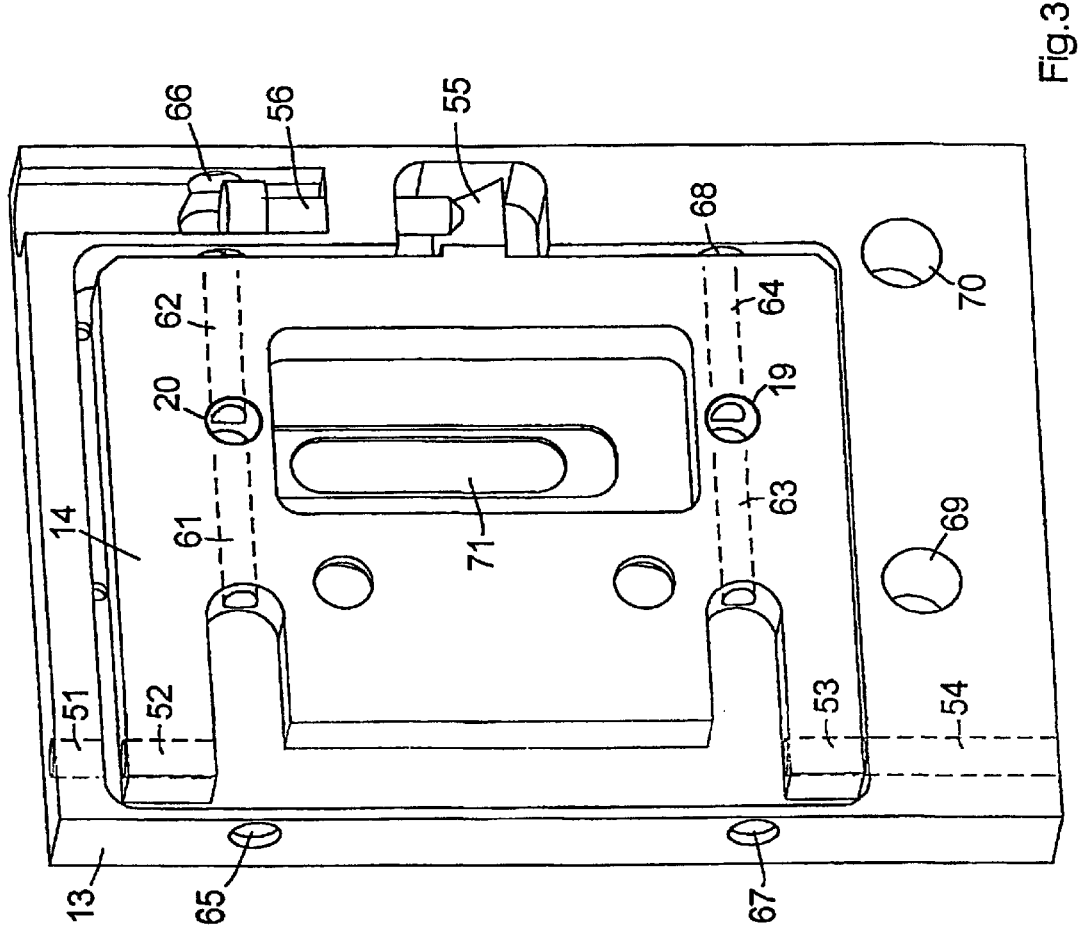
FIG. 3 shows an apparatus for adjusting the focusing and the rotation position of the line sensor.

FIG. 3 shows the apparatus for focus adjustment and for rotation position adjustment of the line sensor. In addition to the mounting plate 13, this has a mount 14, which can pivot about an axis running parallel to the line direction. Suitable holes 51 to 54 are provided for this purpose in the mounting plate 13 and in the mount, and suitable locating pins are located in these holes 51 to 54 in the assembled state. The mount 14 can then be pivoted like a door. The pivoting movement is set by an incline 55 together with adjusting screw 56, with a spring (which is not illustrated) pressing the mount or the incline 55 against the tip of the adjusting screw 56. It is thus possible to adjust the focus by rotating the adjusting screw 56.

As already described in conjunction with FIG. 1, the sensor holder 16 is mounted together with the sensor 15 by means of two pins 17, 18 in holes 19, 20 in the mount 14. The pins are flattened on one side and have a somewhat smaller diameter than the holes 19 and 20, into which threaded holes 61 to 64 in each case open from two sides. Further adjusting screws, which cannot be seen in FIG. 3, are located in these threaded holes 61 to 64 and act on the pins 17, 18 (FIG. 1) from both sides, so that lateral adjustment can be carried out in each of the holes 19, 20, with adjustment in the opposite direction resulting in the line sensor being rotated.

The pin 17 is defined as a reference point with respect to the line. In order that this pin adopts the correct position in the line direction during insertion into the mount 14, at least the pin 17 is flattened on one side. The edges of the flattened region, which are then defined by the adjusting screw in the threaded hole 64, are pressed against the wall of the hole 19.

Holes 65 to 68, which are aligned with the threaded holes 61 to 64, are provided in the mounting plate 13 for insertion of a tool for the adjusting screws in the threaded holes 61 to 64. Holes 69, 70 are used for mounting on the mounting block 6 (FIG. 1). An elongated cutout 71 exposes the line sensor 15 for the incident light.

What is claimed is:

1. Apparatus for adjusting a line sensor in a film scanner comprising:

a colour splitter for splitting the image into the primary colours;

a line sensor for each primary colour, and a glass pane for each line sensor for adjusting the horizontal and vertical positions of the film line which is imaged on the sensor, a holder for holding the glass pane, mounted at three points, with two points being adjustable such that the glass pane can be pivoted in two directions from a plane at right angles to the beam direction, and the light emerges offset from the glass pane as a function of the pivoting angle.

2. Apparatus according to claim 1, wherein the pivoting directions are essentially at right angles to one another.

3. Apparatus according to claim 2, wherein one contact point is provided jointly for both pivoting directions.

4. Apparatus according to claim 1, wherein the holder is mounted on a fixed holding point of a housing such that it can pivot, with the holder having two inclines on each of which an adjusting screw, which is mounted in the housing, acts such that the holder can be adjusted in two directions against the spring force of a spring between the holder and the housing.

5. Apparatus according to claim 1, wherein the line sensor is arranged on a mount which can pivot about an axis parallel to the lines.

6. Apparatus according to claim 5, wherein the mount is provided with an incline on the side of the line sensor opposite the pivoting axis, on which incline an adjusting screw acts against a spring force.

7. Apparatus according to claim 1, wherein the line sensor is arranged on the mount by means of a sensor holder, such that the sensor holder has two pins in an extension of the longitudinal axis (line direction) of the line sensor, which pins project into holes in the mount and have play at right angles to the line direction, and in that an adjusting screw projects into the hole from each of the two sides.

8. Apparatus according to claim 7, wherein the pins are flattened on one side.

* * * * *